Figure 1:
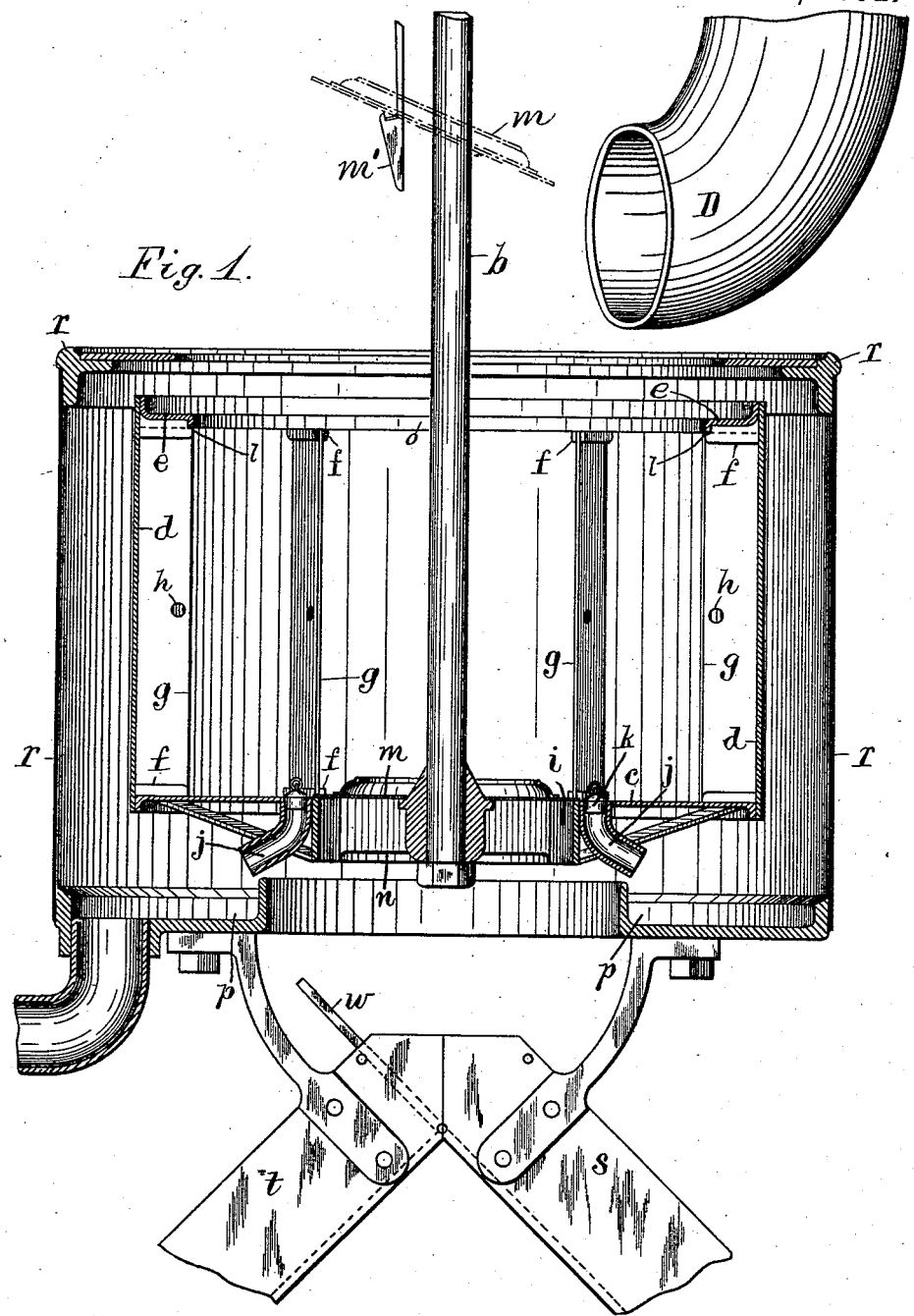

(No Model.) 2 Sheets—Sheet 1.

G. A. KERR.
CENTRIFUGAL STARCH REFINING AND SEPARATING MACHINE.

No. 471,614. Patented Mar. 29, 1892.

Attest:
L. Lee,
J. Van Nest Jr.

Inventor.
George A. Kerr,
per Crane & Meller, Attys (No Model.)  2 Sheets—Sheet 2.
G. A. KERR.
CENTRIFUGAL STARCH REFINING AND SEPARATING MACHINE.
No. 471,614. Patented Mar. 29, 1892.
Fig. 2.
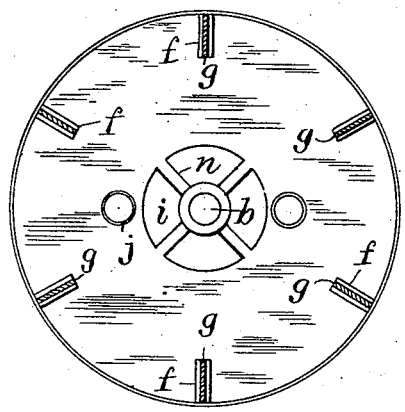
Fig. 7.
Fig. 3.
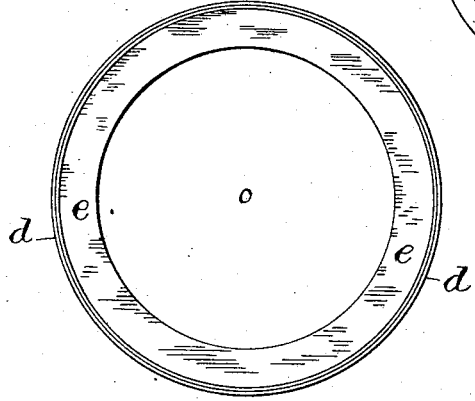
Fig. 6.
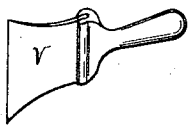
Fig. 5.
Fig. 4.
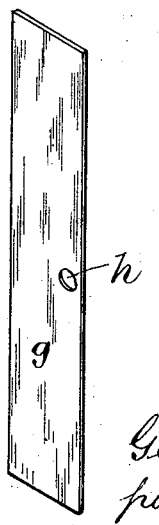
Attest:
L. Lee,
J. Van Nest Jr.
Inventor.
George A. Kerr,
per Crane & Miller, Attys.

UNITED STATES PATENT OFFICE.

GEORGE A. KERR, OF COLUMBUS, INDIANA.

CENTRIFUGAL STARCH REFINING AND SEPARATING MACHINE.

SPECIFICATION forming part of Letters Patent No. 471,614, dated March 29, 1892.

Application filed August 14, 1891. Serial No. 402,623. (No model.)

*To all whom it may concern:*

Be it known that I, GEORGE A. KERR, a citizen of the United States, residing at Columbus, Bartholomew county, Indiana, have invented certain new and useful Improvements in Starch Refining and Separating Machines, fully described and represented in the following specification and the accompanying drawings, forming a part of the same.

The object of this invention is to separate the water and gluten from the starch during the refining process by centrifugal force without any loss of the starchy material, and this object is effected by a particular construction of the centrifugal drum or so-called "basket."

In my invention the periphery or shell of the rapidly-rotating drum is made imperforate, and the water, gluten, and starch are separated by the centrifugal force and arranged in concentric layers, with the starch packed into close contact with the periphery or shell of the drum, the adhesion of the starchy particles causing them to remain in a cylindrical shell within the drum when the rotation of the drum is stopped. The water is then drawn off through suitable apertures in the bottom of the drum, which are closed during the refining operation, so that absolutely nothing escapes from the drum during the process. The shell or periphery of the drum is divided internally into separate segmental spaces by a number of removable division-plates, which are inserted within the drum at its periphery and operate to grasp and rotate the starch-milk when first introduced, as well as to divide the starch which is deposited within the shell into separate segments. The division-plates are shown herein fitted removably in grooves formed in the bottom and cover of the drum, and may thus be taken out when removing the starch from the receptacle or cleaning the apparatus. The removability of the division-plates enables the operator to take them out of the drum at the close of the refining operation, and to thus remove the starch from the interior of the drum with much greater facility, the plates operating to cut up the cylindrical shell of starch into segments which are more readily detached from the drum than a continuous shell of starch could be.

The invention will be understood by reference to the annexed drawings, in which—

Figure 1 is a sectional elevation where hatched of a machine having the drum constructed with my improvements. Fig. 2 is a plan of the same in section on line *x x* in Fig. 1. Fig. 3 shows the upper end of the drum, and Fig. 4 a perspective view of one of the movable division-plates. Fig. 5 is a perspective view of the bent scraper for removing the gluten from the starch. Fig. 6 is a perspective view of the paddle or chisel for loosening the starch from the drum, and Fig. 7 is a plan view of plate *m*.

The drum or basket of the centrifugal machine is driven by a rotating spindle *b*. The drum is suspended from the lower end of the spindle as is common in machines from which the contents are discharged at the bottom of the drum, and the spindle is driven to rotate the basket by suitable gearing, which is not shown herein, as my improvements relate entirely to the construction of the drum. The drum is shown with bottom *c*, shell *d*, and an annular cover *e*, in the center of which is the feed-opening *o*. Ribs *f* are shown fixed to the bottom and to the under side of the cover to retain the division-plates *g* in place, the plates being shown of the same width as the annular cover. Instead of ribs upon the bottom and cover, grooves may be formed in their substance to admit the division-plates. One of the plates is shown detached from the drum upon a larger scale in Fig. 4 with a hole *h*, by which it may be caught, to remove it from its working position.

*i* is the discharge-opening in the bottom of the drum, and *j* are water-passages formed in the bottom of the drum adjacent to such opening, with their nozzles bent outwardly. Plugs or stoppers *k* are shown fitted in the mouths of the water-passages and are used to prevent the escape of fluid when the starch is being treated.

The opening *i*, as shown in Fig. 2, is intersected by the metallic arms *n*, which connect the bottom of the drum with the spindle, and the opening is closed by an annular valve-plate m, which may be lifted to discharge the contents of the drum, and may then be suspended by a hook m' above the drum, as indicated by dotted lines in Fig. 1.

The drum is surrounded by curb r, having an annular gutter p formed in the bottom, as is common, to receive the water discharged from the nozzles of the passages j. Two chutes s and t, inclined in opposite directions, are shown with their mouths joined beneath the opening i, and a gate w is arranged to cover the mouth of either chute at pleasure. The chute s is designed to receive the starch discharged from the drum and the chute t to receive the gluten, the chutes leading their contents to any suitable receptacle and the gate being adapted to throw the contents of the drum into either chute at pleasure.

The operation of the machine is as follows: The movable division-plates are inserted in the drum and the starch milk or fluid is supplied in a stream to the drum by pipe D, while the drum is rotated, and is thus distributed equally upon the sides of the casing between the division-plates. The drum is, in refining, rotated about nine hundred turns per minute, and at such speed would not grasp the fluid or set it in rotation at all without the plates g. Without the division-plates the drum fails to carry the starch-milk with it, and the milk finally gathers at one side of the drum, which throws the machine out of balance at once, so that it cannot be operated. Without the plates no starch separation is attainable, but with the plates the fluid may be introduced when the machine is running at one-half its normal speed and the speed quickly increased to nine hundred turns per minute. The rotation of the drum separates the ingredients, as desired, and such separation, owing to the density of the respective particles, forms the layer of starch next the casing, the layer of gluten inside the same, and the layer of water within the layer of gluten. When the separation is completed, the water falls to the bottom of the drum and is prevented from entering the opening i by the annular valve m. The plugs k are then removed and the liquid which is separated from the starch is allowed to flow out of the drum into the gutter p. The valve m is then raised and suspended upon the hook m' and the gate w is adjusted over the gluten-chute t. The layer of gluten is then scraped from the inside of the starch layer by the bent scraper u, which may be formed, as shown in Fig. 5, in the steel plate attached to a handle and curved at the end to scrape off the gluten. The gluten being discharged from the opening o into the chute t the gate is turned to cover the chute t, and the starch is then loosened or dug from the inside of the casing by a steel paddle or scraper which is made like a broad thin chisel-blade v with wooden handle, as shown in Fig. 3, and discharged into the chute s.

The apparatus offers in its rapidity of operation an immense advantage over the usual methods for refining starch—namely, settling-tables and settling-vats. It also separates all the granular starch or other portions of the corn or other cereals, and by extracting the excess of moisture from the gluten and other refuse matter of the grain the process secures in the same operation the refining of the starch and the solidifying of the gluten into marketable condition. My refining process also wholly obviates the further washing of the starch, as the product from my centrifugal treatment is of greater purity than is procurable by the older methods. The loss of pure starch is also impossible with my process, as every particle of the starch is accumulated in a single layer and is not liable to be carried off with the water and gluten, as happens when the starch is refined by tables or vats, and the starch is not compacted into so firm a mass as in the centrifugal drum. The centrifugal action not only compacts the starch in a high degree, but it also compacts the gluten, so that it is in a pasty form fit for immediate use as cattle-food. It will be noticed that the water-passages j at the side of the central opening in the bottom of the drum furnish a means for discharging the water from the drum separately from the starch and gluten. The water-passages j lead toward the gutter p, and thus divert the water entirely from the center of the drum, through the bottom of which the more solid substances are discharged without interfering with the water. I have therefore claimed the imperforate drum in connection with such water-passages, and also the imperforate drum in connection with the central discharge-opening i in the bottom, and the double chute provided with a movable gate to permit the separation of the gluten from the starch when each is drawn from the drum.

I am aware that narrow perforated bars have been inserted removably between the bottom and cover of the drum at the inner edge of the cover to arrest the movement of the liquid when the basket is stopped, and I do not, therefore, claim such bars. I am not, however, aware that any division-plates have been fitted into contact with the shell of an imperforate drum and operating to divide the periphery of the drum into distinct segmental spaces, in which portions of the starch-milk and starch are held separately from the adjacent portions.

Having thus set forth my invention, what I claim is—

1. The starch-separator consisting in the imperforate drum provided at the top with a suitable cover and at the bottom with a central discharge-opening i and having the division-plates g inserted between the bottom and cover adjacent to the casing, in combination with the inclined chutes $s$ and $t$, with their junction arranged beneath the discharge-opening and provided with the adjustable gate $w$, as and for the purpose set forth.

2. The starch-separator consisting in the imperforate drum surrounded by the curb $r$, having an annular gutter formed in the bottom, the drum being provided at the top with a suitable cover and at the bottom with a central discharge-opening $i$, and one or more water-passages $j$ in the bottom of the drum, with their nozzles directed outward toward the gutter $p$, as and for the purpose set forth.

In testimony whereof I have hereunto set my hand in the presence of two subscribing witnesses.

GEORGE A. KERR.

Witnesses:
W. JONES,
E. O. WINTERROWD.